United States Patent
Kempf et al.

(10) Patent No.: US 7,044,257 B2
(45) Date of Patent: May 16, 2006

(54) DRIVE SYSTEM OF A UTILITY VEHICLE

(75) Inventors: Bernd Kempf, Althornbach (DE);
Jürgen Hofer, Grossbundenbach (DE);
Stefan Bohrer, St. Wendel (DE)

(73) Assignee: Deere & Company, Moline, IL (US)

( * ) Notice: Subject to any disclaimer, the term of this patent is extended or adjusted under 35 U.S.C. 154(b) by 46 days.

(21) Appl. No.: 10/389,854

(22) Filed: Mar. 14, 2003

(65) Prior Publication Data

US 2003/0173133 A1   Sep. 18, 2003

(30) Foreign Application Priority Data

Mar. 16, 2002   (DE) ................................ 102 11 799

(51) Int. Cl.
*B60K 17/00* (2006.01)

(52) U.S. Cl. ........................ 180/305; 180/307; 180/308

(58) Field of Classification Search ................ 180/305, 180/306, 307, 308, 367, 197; 60/425, 468, 60/423, 426, 431, 433, 436, 437
See application file for complete search history.

(56) References Cited

U.S. PATENT DOCUMENTS

| | | | | |
|---|---|---|---|---|
| 5,062,498 A | * | 11/1991 | Tobias ......................... | 180/308 |
| 5,199,525 A | | 4/1993 | Schueler ...................... | 180/242 |
| 5,775,453 A | * | 7/1998 | Williams et al. ............. | 180/197 |
| 5,887,674 A | * | 3/1999 | Gray, Jr. ...................... | 180/307 |
| 6,073,716 A | * | 6/2000 | Ellertson et al. ............. | 180/197 |
| 6,209,322 B1 | * | 4/2001 | Yoshida et al. ............... | 60/452 |
| H1977 H | * | 8/2001 | Poorman ...................... | 60/445 |
| 6,312,870 B1 | * | 11/2001 | Malik et al. .................. | 430/270.1 |
| 6,374,702 B1 | * | 4/2002 | Scheid et al. ................ | 74/730.1 |
| 6,422,333 B1 | * | 7/2002 | Kj.ae butted.r et al. ...... | 180/197 |
| 6,474,063 B1 | * | 11/2002 | Sawada et al. ................ | 60/426 |
| 6,488,111 B1 | * | 12/2002 | McKenna et al. ........... | 180/308 |
| 6,675,575 B1 | * | 1/2004 | Cunningham ................ | 60/425 |

FOREIGN PATENT DOCUMENTS

| | | |
|---|---|---|
| DE | 199 18 882 A | 12/1999 |
| EP | 0 985 592 | 3/2000 |
| EP | 1 223 069 | 7/2002 |
| WO | WO 92 18345 | 10/1992 |

\* cited by examiner

*Primary Examiner*—Hau Phan

(57) ABSTRACT

A drive system for use in utility vehicles, such as agricultural forage harvesters and combines, includes a hydrostatic transmission having a pump driven by a main engine of the vehicle and having first and second motors respectively coupled to front and rear axles of the vehicle by way of first and second differential gear sets. The pump and one or both of the motors have a variable displacement determined by positioning respective swash plates through the agency of a lever, in the case of the pump, and by electronic devices, in the case of the motors, the electronic devices acting in response to control signals sent by a control arrangement, which in turn, operates in response to signals produced by pressure sensors associated with the motors and by signals produced by speed sensors associated with output shafts of the hydraulic motors. The control arrangement has a memory for storage of data, such as maximum legal ground speed and the ratio of the speeds of the axles as results from a given wheel size, and uses this information for controlling the hydrostatic transmission such that the vehicle does not exceed the speed, and the front and rear axles are driven so as to produce the same ground speed.

3 Claims, 3 Drawing Sheets

DRIVE SYSTEM OF A UTILITY VEHICLE

FIELD OF THE INVENTION

The invention concerns a drive system of a utility vehicle, with a main drive engine, that is connected so as to drive a hydraulic pump, that is connected with a hydraulic motor so as to conduct hydraulic fluid which is connected so as to drive at least one wheel that is in engagement with the ground and whose fluid displacement can be varied by an actuator connected to a control arrangement, where the control arrangement is connected with a rotational speed sensor arranged to detect the rotational speed of the wheel and that can be operated to control the actuator as a function of the signals of the rotational speed sensor.

BACKGROUND OF THE INVENTION

In many utility vehicles, such as agricultural vehicles and harvesting machines, hydraulic drives are applied. They include a pump driven by an internal combustion engine and a motor connected to the pump so as to conduct hydraulic fluid, that drives a wheel or several wheels. In some vehicles the wheels of the front axle and the rear axle are driven hydraulically in each case by at least one motor associated with the axles.

In such hydraulic all-wheel drives there is a problem in certain operating situations, particularly in operating downhill, when a greater load is applied to the front axle than to the rear axle. The drive motors then operate as pumps that generate a pressure that may be greater than the pressure of the pump. Due to the differing friction forces at the wheels acting on the ground due to the differing loads, the condition can occur that the direction of the flow at an axle carrying a smaller load reverses and that the wheels on this axle rotate opposite to the direction of operation. This results in the so-called back-spin effect.

U.S. Pat. No. 5,199,525 A describes a control circuit for a hydraulic all-wheel drive. A hydraulic motor is associated with each of the front and rear axles that are driven by a single pump. A pressure controlled valve arrangement is provided, between the pump and the motor at the rear wheel, that is critical relative to the back-spin effect. When a pressure difference in the supply line of the motor of the rear wheel reaches a pre-determined value, the valve changes its position. In this position the pressure load for the motor of the rear wheel is interrupted by the pump arrangement and is now operating in a no-load condition. Thereby the occurrence of the back-spin effect is reduced, but at the expense of the braking effect of the rear wheel, which in a corresponding situation, only runs along without any load.

DE 199 18 882 A describes a hydraulically driven vehicle, particularly a harvesting machine, where the individual wheels are associated with hydraulic motors and rotational speed sensors. Calculated rotational speeds are compared with measured rotational speeds. Each rotational speed signal that exceeds the calculated value indicates a slipping or overrunning wheel. A signal is sent to the displacement control plate of the particular motor in order to reduce its fluid displacement and to avoid an overrunning of that wheel.

Operating situations are conceivable in which a single sensor detects either the rotational speed of a wheel or the pressure difference in the supply line of a hydraulic motor, and delivers a measured value, that does not permit any useful conclusion as to the operating situation and the measures that are to be taken. In that way, the pressure difference can point to a motor that is rotating, but whose driven wheel is slipping relative to the ground. On the other hand, a rotational speed sensor also can point to a rotating wheel even though it is subject to the back-spin effect.

The problem underlying the invention is seen in the need to make available an improved drive system for a utility vehicle that does not suffer the aforementioned disadvantages.

SUMMARY OF THE INVENTION

According to the present invention, there is provided an improved hydrostatic, four-wheel drive system for a utility vehicle.

An object of the invention is to provide such a drive system which includes a control arrangement together with requisite drive speed and pressure sensor for controlling the pump and motor units of the hydrostatic transmission in such a way as to prevent the motor unit(s) from being driven like a pump.

The drive system of the utility vehicle, which may, in particular, be a self-propelled harvesting machine, includes a main drive engine that usually is an internal combustion engine. The main drive engine drives a hydraulic pump directly or indirectly, that is, over intervening mechanical, hydraulic or other desired gearboxes. The hydraulic pump is connected over a hydraulic line with a hydraulic motor that mechanically drives a wheel or a track drive that is in engagement with the ground. A rotational speed sensor is arranged to detect the rotational speed of the wheel. Its signal is conducted to a control arrangement that controls an actuator that is arranged to vary the fluid displacement of the hydraulic motor. It is proposed that the control arrangement be connected with a pressure sensor whose signal contains information about the pressure difference between the inlet and the outlet of the hydraulic motor. The control arrangement controls the actuator on the basis of the signals of the rotational speed sensor and the pressure sensor.

In this way, the control arrangement receives two items of information that are independent of each other about the operating condition of the hydraulic motor. The pressure difference between the inlet and the outlet of the hydraulic motor, measured by the pressure sensor, contains information about the force mechanically transmitted from the hydraulic motor to the ground (or the torque or the power). On the basis of the signal of the pressure sensor, it is then possible to recognize whether the wheel is driving the utility vehicle when the pressure at the inlet is greater than at the outlet, or whether the wheel is spinning when the pressure at the inlet is approximately equal to the pressure at the outlet, or whether the wheel is rotated in a direction opposite to the intended direction of rotation by a further hydraulic motor acting as a pump, for example, on an incline, that is, it is subject to the back-spin effect, when the pressure at the outlet is greater than at the inlet. In addition, the rotational speed of the wheel is detected by the rotational speed sensor. On the basis of the signals from both sensors the control arrangement is in the position to induce the actuator to adjust the fluid displacement of the hydraulic motor in such a way that the wheel rotates in the desired direction with the desired rotational speed. By the use of the feedback of both items of information about the operating condition of the wheel an adaptive control system results. In traction operation, for example, during braking or operating down-slope, a blocking or reverse rotation of driven rear wheels can be avoided. In this case the rear wheels are not stopped which would lose their braking effect, but are supplied with a hydraulic fluid flow adapted to the particular situation. During operation uphill in reverse, the hydraulic flow is not lost to spinning rear wheels, but is conducted to the front wheels.

In case of necessity, the invention makes possible a gentle change in the position of the actuator, so that jerky decelerations or accelerations of the utility vehicles are avoided. In operating uphill, forward as well as backward, the regulation of the fluid displacement of the hydraulic motor results in optimum traction even at a rear axle which is loaded less heavily than the front axle. During operation downhill, the drive system prevents the rear wheels from rotating backwards or remaining stopped. The utility vehicle can be steered with a much greater degree of safety. In comparison to mechanical all-wheel drives, the drive system is very advantageous, since it requires less space, wheels of any desired size can be used, and the power of the drive is automatically applied at the location where it can also be transmitted to the ground. Since no universally jointed shaft is required, the invention can also be applied to combines.

The pressure sensor can measure the pressure at the outlet of the hydraulic motor. In this embodiment, the control arrangement is supplied with a further information that refers to the pressure at the inlet of the hydraulic motor. This information can be obtained by a pressure sensor arranged at the inlet or derived from a signal that is a function of the pressure that the hydraulic pump makes available or provides this pressure as input. Hence, in a hydraulic pump with variable fluid displacement, the position of the swash plate, or its repositioning drive, can be detected by a sensor or the repositioning signal of an actuator wherein the reposition of the swash plate can be detected. The position of an operating control lever, used to reposition the swash plate of the hydraulic pump, could also be detected in order to make available information about the pressure existing at the inlet of the hydraulic pump.

In another embodiment, a single pressure sensor is used which detects the pressure difference that exists between the inlet and the outlet of the hydraulic motor. For this purpose, a pressure sensor with a movable membrane could be used whose one side is connected with the outlet and the other side with the inlet so as to conduct hydraulic fluid. The position of the membrane is detected by a feeler.

Fundamentally, it would be conceivable to drive two wheels of a driven axle by one each hydraulic motor associated with the individual wheel. For reasons of cost, however, the use of a single hydraulic motor for the wheels of one axle is preferred, which is preferably connected over a limited slip differential gearbox with the two wheels.

Many utility vehicles are provided with two driven axles. An obvious solution is to also associate at least one (second) hydraulic motor with the second axle, that is supplied with pressurized hydraulic fluid from the hydraulic pump. The axle that is less critical from the traction standpoint and that is the front axle in the case of harvesting machines that carry the greatest axle load, as a rule, can be associated with a second hydraulic motor with fixed fluid displacement, since spinning of the wheels or track drives of this axle that is loaded with a greater load than the other axle is relatively unlikely. Thereby the cost of a second hydraulic motor with variable fluid displacement can be eliminated.

In other embodiments, the second axle that can be driven is associated with at least a second hydraulic motor with variable fluid displacement, whose actuator can be controlled by the control arrangement. Preferably, the second hydraulic motor is also associated with a pressure sensor that is arranged to make signals available that contain information about the difference of the pressures existing at the inlet and the outlet of the second hydraulic motor. The signal of the second pressure sensor is supplied to the control arrangement which controls the second actuator as a function of the signal from the second pressure sensor.

The control arrangement is appropriately supplied with the signal of a second rotational speed sensor that is arranged to detect the rotational speed of a wheel of the second axle. Such a sensor is useful in order to complete the information supplied to the control arrangement, in particular, independent of the question whether the second axle is driven or not and whether it is driven, if necessary, by a hydraulic motor with variable or with fixed displacement. The second rotational speed sensor detects the rotational speed of a wheel, that as a rule, is not as critical as to its traction and makes available information about the actual velocity of the utility vehicle. It would also be conceivable to use a sensor interacting directly with the ground in addition or alternatively to the second rotational speed sensor, for example, a radar sensor.

With utility vehicles, two driven axles wheels of differing diameters are frequently applied to the two axles. Often the wheels are exchanged with wheels of different diameters, that just happen to be available. In order to assure that the wheels of both axles are driven at the same circumferential speed—in order to avoid unnecessary wear of the treads of the wheels—it is appropriate after each change of the size of the wheels to make the gear ratio of the drives of the wheels conform with the actual size of the wheels. This conformity could be performed in mechanical drives by a costly change in the gear ratio. In a hydraulic drive, according to the invention in which the wheels of two axles are each driven by a hydraulic motor, of which at least one is provided with a variable fluid displacement, it is possible by means of the control arrangement and the actuator to obtain an automatic conformity of the gear ratio. In a simple embodiment, information is manually provided as input about the ratio of the wheel sizes of the first and second axle. During the operation, this information is considered by the control arrangement in the control of the actuator. In a comfortable embodiment, a calibration mode can be selected by means of a corresponding input in an input arrangement. In the calibration mode that is preferably performed most appropriately on a surface that is not critical in regard to traction, the control arrangement detects the rotational speeds of the wheels of both axles, from which the aforementioned information about the ratio of the wheel sizes is derived. Then the control arrangement controls the actuator in such a way that the circumferential speed of the wheels of both axles is equal. This thought deserves independent inventive status.

To provide input for the velocity of the utility vehicle, a hydraulic pump is used that as a rule has a variable flow volume. In the simplest configuration, the displacement volume is controlled purely mechanically, electro-mechanically or hydraulically by an operating control lever and/or a pedal. In a preferred embodiment, the hydraulic pump is associated with an actuator connected with the control arrangement that is used to adjust the fluid displacement of the hydraulic pump. To provide the input for the target velocity of the utility vehicle, the operator is provided with an operating arrangement, for example, in the form of an operating control lever which supplies a target velocity signal to the control arrangement that is considered in the control of the actuator of the hydraulic pump.

Particularly in harvesting machines, the load on the main engine is a function of the forward propulsion velocity, since the rate at which the harvested crop is taken up and processed is a function of the velocity and the crop processing arrangements, for example, chopper drums or threshing and separating arrangements absorb a considerable proportion of the power supplied by the main engine. In utility vehicles of this type, it is useful to control the forward propulsion velocity, not only as a function of a target value that is provided as input by an operator, but to control it in such a way that the load on the main engine is constant or remains within a predetermined range. For this reason, a load sensor is proposed that makes available information about the load on the main engine and supplies this to the control arrangement which repositions the actuator of the hydraulic pump as a function of the load on the main engine, as detected. The load sensor measures the load on the main engine directly or indirectly; it can detect, for example, the rotational speed or the fuel consumption of the main engine or a rate of supply of the harvested crop to the harvesting machine, for example, with a sensor that measures the spacing between the supply rolls of a forage harvester. In this way, the forward propulsion velocity is made to conform permanently to the load curve of the main engine. The result is an automatic velocity regulation.

The hydraulic pump, that can be repositioned by means of an actuator, can also be used as an input for a maximum road speed specific to the laws of a given country. In this embodiment, the actuator is brought out of its rest position by the control arrangement only to a maximum position that corresponds to a certain maximum velocity.

BRIEF DESCRIPTION OF THE DRAWINGS

The drawings show three embodiments that shall be described in greater detail in the following.

DESCRIPTION OF THE PREFERRED EMBODIMENT

Figure 1:
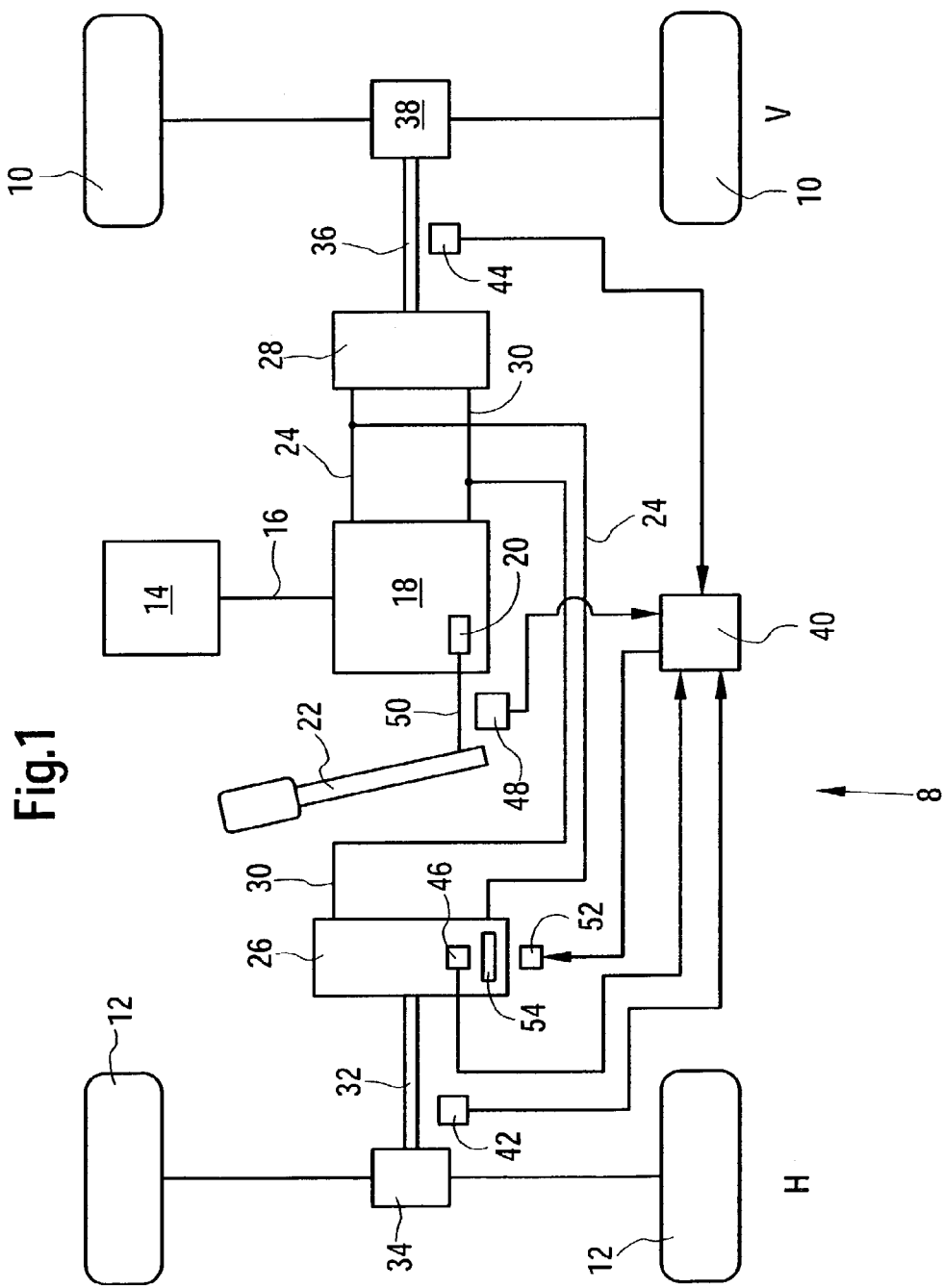
FIG. 1 is a schematic representation of a first embodiment of a drive system constructed according to the invention.

Referring now to FIG. 1, a utility vehicle 8 is schematically shown that is provided with a frame (not shown) or a self supporting chassis that is supported on front wheels 10 and rear wheels 12 that are in engagement with the ground. As a rule, the rear wheels 12 can be steered and the front wheels 10 have a larger diameter than the rear wheels 12 and carry the larger proportion of the weight of the utility vehicle 8, particularly in the case of a harvesting machine in the form of a combine or self-propelled forage harvester. Therefore, the front wheels 10 are less critical in regard to traction than the rear wheels 12.

The drive system includes a main engine 14 in the form of an internal combustion engine (diesel engine). The main engine 14 drives a hydraulic pump 18 over a shaft 16. The fluid displacement of the pump 18 can be varied by a swash plate 20 whose position is controlled mechanically by an operating lever 22 that is located in an operator's cab of the utility vehicle 8. The hydraulic pump 18 is provided with an outlet that is connected by lines 24 with the inlet of a first hydraulic motor 26 and the inlet of a second hydraulic motor 28. An inlet of the hydraulic pump 18 is connected over lines 30 with the outlet of the first hydraulic motor 26 and the outlet of the second hydraulic motor 28. In case the utility vehicle 8 is a self-propelled harvesting machine, the main engine 14 also drives its crop processing or conveying arrangements.

The first hydraulic motor 26 drives the two rear wheels 12 over a first drive shaft 32 and a first limited slip differential gearbox 34. The second hydraulic motor 28 drives the two front wheels 10 over a second drive shaft 36 and a second limited slip differential gearbox 38. The first hydraulic motor 26 can be engaged and disengaged selectively so that a four-wheel drive can be selected only in special operating situations in which a better traction capability is required. Between the second hydraulic motor 28 and the second differential gearbox 38, a shifted gearbox (not shown for the sake of clarity) may be provided with gear ratios that can be selected. For operation in the reverse direction, the shifted gearbox may be provided with a reverse gear ratio, where the first hydraulic motor 26 is turned off during reverse operation or is supplied with a hydraulic flow with reversed flow direction or is also equipped with a reversible gearbox. Alternatively, the direction of flow in the lines 24 and 30 may be reversible for reverse operation by corresponding valves (not shown for the sake of clarity).

A control arrangement 40 is connected with a first rotational speed sensor 42, a second rotational speed sensor 44 and a first pressure sensor 46. The first rotational speed sensor 42 is arranged alongside the first drive shaft 32 and delivers an impulse or several impulses upon each rotation of the first drive shaft 32. It can include an optical or a magnetic sensor that interacts with corresponding markings or permanent magnets that are fastened to the first drive shaft 32. The second rotational speed sensor 44 is arranged alongside the second drive shaft 36 and delivers an impulse, or several impulses, upon each rotation of the second drive shaft 36. It also can include an optical or magnetic sensor that interacts with corresponding markings or permanent magnets, that are fastened to the second drive shaft 36. The pressure sensor 46 is arranged in the interior of the first hydraulic motor 26 and detects the pressure that exists at the outlet of the first hydraulic motor 26. An operating control lever position sensor 48 is associated with the mechanism 50 that transmits the movement of the operating control lever 22 to the swash plate 20 of the hydraulic pump 18. The operating control lever position sensor 48 optically or magnetically detects the actual position of the operating control lever 22.

The control arrangement 40 is connected with an electromechanical actuator 52 that is arranged for the repositioning of a swash plate 54 of the first hydraulic motor 26. Information about the position of the actuator 52 can be fed back to the control arrangement 40. If a stepper motor is used as actuator 52, this feedback connection can be omitted. Basically it is not required, since the operating condition of the first hydraulic motor 26 is detected.

From the second rotational speed sensor 44, the control arrangement 40 received a measured value relative to the front wheels 10 that, as a rule, contains appropriate information about the actual velocity of the utility vehicle 8, due to the less critical traction of the front wheels 10. Furthermore, the control arrangement 40 receives information from the first rotational speed sensor 42 about the rotational speed of the rear wheels 12. On the basis of a comparison of the measured values of the rotational speed sensors 42 and 44, the control arrangement 40 tests whether the rear wheels 12 are slipping or have a good contact with the ground. If necessary, the position of the swash plate 54 is corrected by the actuator 52 in order to slow spinning rear wheels 12. In addition, the control arrangement 40 calculates the pressure existing at the inlet of the first hydraulic motor 26 on the basis of the signal from the operating control lever position sensor 48. This pressure is compared with the pressure at the outlet of the hydraulic motor 26, which was measured by the pressure sensor 46. This comparison permits a further determination of the operating condition of the first hydraulic motor 26. If the pressure at the inlet is higher than at the outlet, the first hydraulic motor 26 produces power and drives the utility vehicle 8 forward. If the pressure at the inlet is not much higher than at the outlet, the traction of the rear wheels 12 is bad. Then the control arrangement 40 induces the actuator 52 to reposition the swash plate 54 in the direction of lower velocity until traction is again established and the pressure at the inlet is higher than at the outlet of the first hydraulic motor 26. If the pressure at the outlet is higher than at the inlet, which can occur, for example, if during braking or downhill operation, the second hydraulic motor 28 operates as a pump, which can have the result that the first hydraulic motor 26 rotates backward in an undesirable manner (backspin effect), then the control arrangement 40 controls the actuator 52 into such a position that the first hydraulic motor 26 is turned off. In this case, it would be conceivable to have a reversal of the direction of flow in the first hydraulic motor 26 by reversing the lines 24 and 30 by means of a valve. In this way, the control arrangement 40 is able, on the basis of the information supplied to it from the three sensors 42, 44, and 46, to optimally control the actuator 52.

Figure 2:
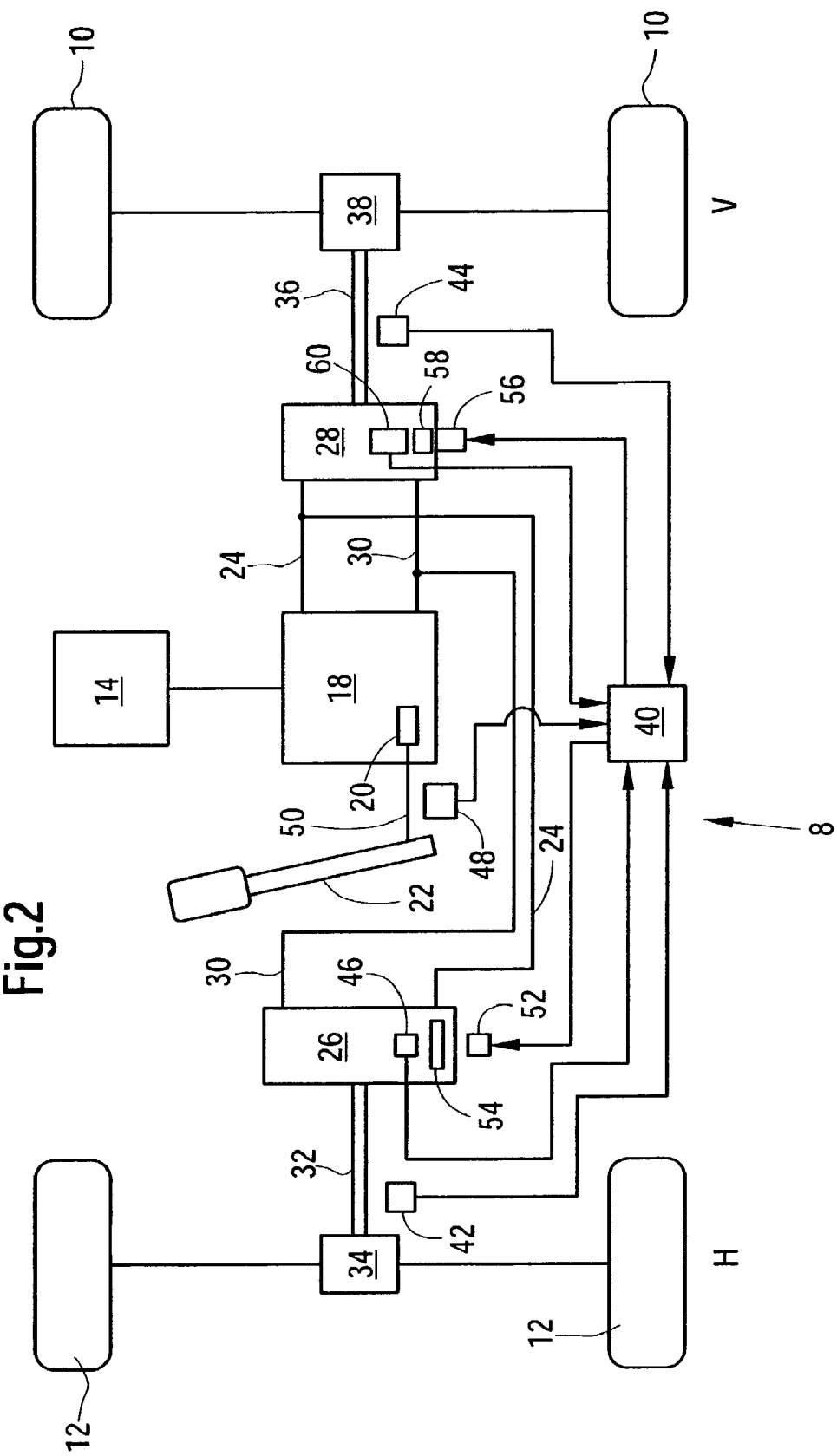
FIG. 2 is a schematic representation of a second embodiment of a drive system constructed according to the invention.

Referring now to FIG. 2, there is shown a second embodiment of a drive system for a utility vehicle 8. Elements coinciding with the first embodiment are identified with the same number call-outs. The essential difference relative to the first embodiment lies in the fact that the second hydraulic motor 28 is also provided with a variable fluid displacement by an electro-mechanical actuator 56 and an adjustable swash plate 58, and that it is associated with a second pressure sensor 60 that measures the pressure at the outlet of the second hydraulic motor 28. The control arrangement 40 is connected with the pressure sensor 60 and the actuator 56. The control arrangement 40 detects the operating condition of the first hydraulic motor 26, as in the case of the first embodiment, and analogously the operating condition of the second hydraulic motor 28 and analogously controls the two actuators 52 and 56 in such a way that an optimum operating condition of the hydraulic motors 26 and 28 is achieved.

Figure 3:
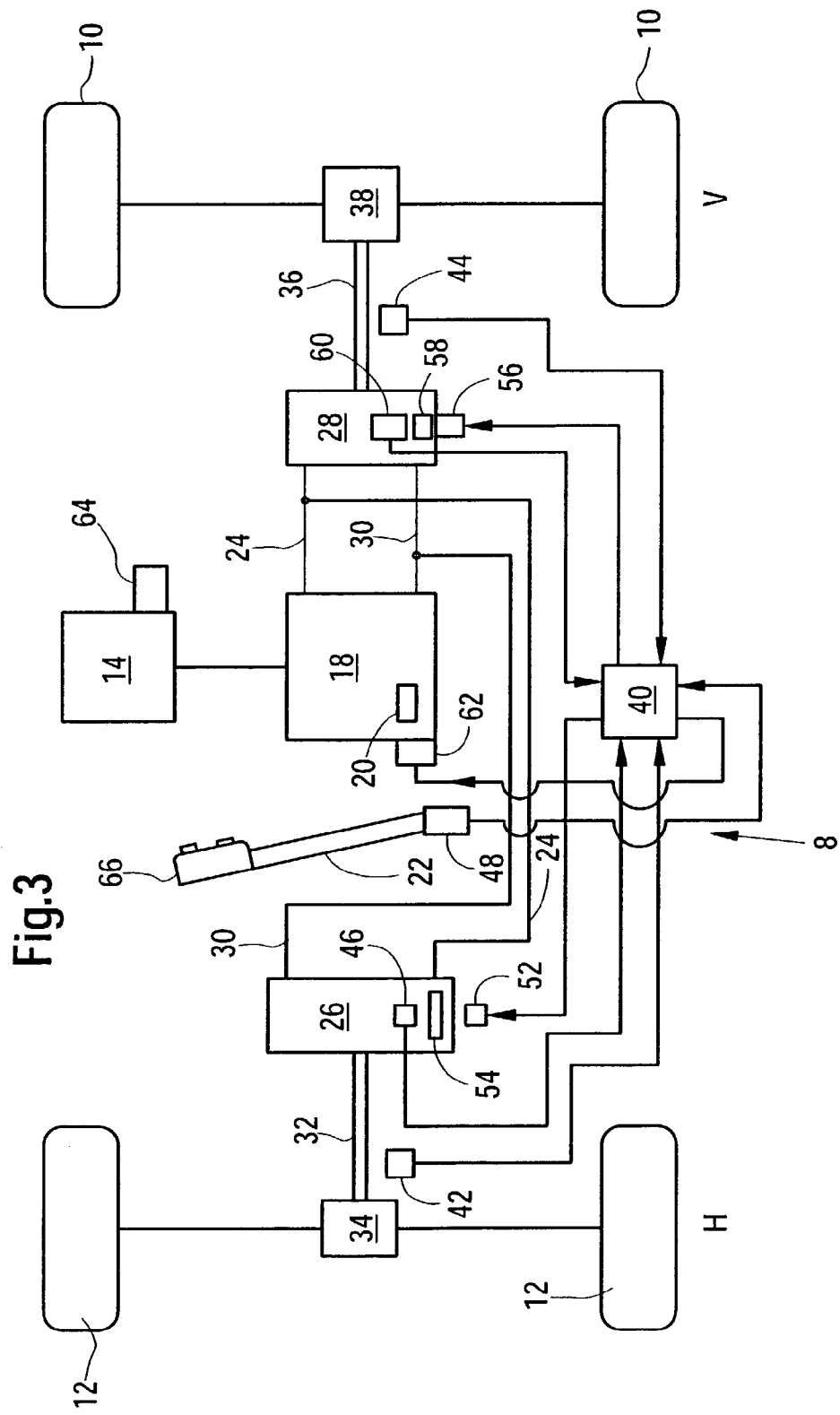
FIG. 3 is a schematic representation of a third embodiment of a drive system constructed according to the invention.

Referring now to FIG. 3, a third embodiment of a drive system of a utility vehicle 8 is shown wherein elements coinciding with the first or the second embodiment are identified with the same number call-outs. The essential difference of the third embodiment relative to the second embodiment lies in the fact that the operating control lever 22 is not connected over a mechanism (50 in FIG. 2) with the swash plate 20 of the hydraulic pump 18. Instead of that, a third actuator 62 is provided that operates electro-mechanically or electro-hydraulically and is controlled by the control arrangement 40. It is conceivable that the control arrangement 40 is supplied, in addition, with information about the immediate position of the third actuator 62. However, such a feedback is not absolutely necessary, since a stepper motor can be used, and since the control arrangement 40 has been supplied with information about the operating condition of the hydraulic pump 18 due to the feedback particularly over the rotational speed sensors 42 and 44. The control arrangement 40 contains information about the position of the operating control lever 22 from the operating control lever position sensor 48 and controls the third actuator 62 in a corresponding manner.

The rotational speed sensors 42 and 44 measure the actual velocity of the utility vehicle 8. When this reaches or exceeds a predetermined maximum speed specific to a given country, the control arrangement 40 induces the third actuator 62 to bring the swash plate 20 of the hydraulic pump 18 into a position that corresponds to a lower velocity. This provides assurance that the allowable maximum speed is maintained. Furthermore the control arrangement 40 detects the operating conditions of the first and the second hydraulic motors 26 and 28, as in the case of the second embodiment and controls the two actuators 52 and 56 in such a way that an optimum operating condition of the hydraulic motors 26 and 28 is achieved.

In the third embodiment, the main engine 14 is associated with a load sensor 64 in the form of a rotational speed sensor that detects the rotational speed of the main engine 14. On the upper side of the operating control lever 22, an input arrangement 66 is arranged that includes several manually operated keys. The input arrangement 66 and the load sensor 64 are connected with the control arrangement 40.

The input arrangement 66 permits the selection of an operating mode in which the forward propulsion velocity is set automatically. The control arrangement 40 induces the third actuator 62 to bring the swash plate 20 into a position that corresponds to a velocity that is preset by the operating control lever 22. In case the signal of the load sensor 64 ever indicates that the rotational speed of the main engine 14 has fallen off due to an excessive load, for example, if a chopper arrangement or a threshing and separating arrangement is loaded to a greater degree than that corresponding to an optimum load on the machine due to a relatively high rate of harvested crop taken up, the control arrangement 40 induces the third actuator 62 to move the swash plate 20 in the direction of reduced forward propulsion velocity. As a result, the forward propulsion velocity is adjusted to a value that corresponds to an optimum loading of the main engine 14.

Furthermore, another operating mode can be selected by the input arrangement 66 that is used for the calibration of the actuators 52 and 56. Most appropriately, the calibration mode is performed on a terrain with good traction characteristics, for example, a clean road. The control arrangement 40 induces the utility vehicle 8 to cover a certain distance by the control of the actuators 52, 56, and 62. During this time, the rotational speeds are detected that are measured by the rotational speed sensors 42 and 44. The signals of the rotational speed sensors 42 and 44 permit a conclusion to be drawn about the ratio of the diameters of the front wheels 10 and that of the rear wheels 12. This ratio permits the control arrangement 40 to draw a conclusion into which position the actuators 52 and 54 are to be brought in order to attain equal circumferential speeds of the front wheels 10 and the rear wheels 12 during subsequent operations and to minimize the wear of the treads of the wheels. Such a calibration mode is possible also with the first and the second embodiment, and is most appropriately performed after each change of wheels.

Having described the preferred embodiment, it will become apparent that various modifications can be made without departing from the scope of the invention as defined in the accompanying claims.

The invention claimed is:

1. In a utility vehicle having a drive system including a main drive engine connected so as to drive a hydraulic pump having an outlet and an inlet respectively coupled to an inlet and an outlet of a hydraulic motor so as to conduct hydraulic fluid to and from said hydraulic motor, with said hydraulic motor being connected so as to drive at least one wheel that is in engagement with the ground and whose fluid displacement can be varied by an actuator connected with a control arrangement, where said control arrangement is connected with a rotational speed sensor arranged to detect the rotational speed of the wheel and can be operated so as to control the actuator as a function of the signals of the rotational speed sensor, the improvement comprising: a pressure sensor coupled to said hydraulic motor for generating a pressure signal that contains information about the difference between pressures respectively existing at said inlet and the outlet of said hydraulic motor; said pressure sensor being connected to said control arrangement, with said pressure signal acting to effect operation of said control arrangement such that said control arrangement causes said actuator to be controlled as a function of the pressure signal received from said pressure sensor said actuator being an electronic actuator; an operating arrangement for selectively sending a target velocity signal to said control arrangement; and said control arrangement acting in response to said target velocity signal to control said electronic actuator so that said vehicle does not operate at a velocity in excess of the target velocity.

2. The utility vehicle, as defined in claim 1, wherein said drive system includes a load sensor connected for detecting a load imposed on the main engine and generating a representative load signal that is conveyed to said control arrangement; said control arrangement acting in response to said load signal for effecting a repositioning of said electronic actuator as a function of said load signal.

3. The utility vehicle, as defined in claim 2, wherein said vehicle is a crop harvester and said load sensor detects the load on said main engine by sensing one of a rotational speed of an output shaft of said engine, or a rate at which the utility vehicle is supplied with harvested crop.

* * * * *